US009602231B2

(12) United States Patent
van Houtum

(10) Patent No.: US 9,602,231 B2
(45) Date of Patent: Mar. 21, 2017

(54) OFDM SIGNAL PROCESSING METHOD AND APPARATUS

(71) Applicant: NXP B.V., Eindhoven (NL)

(72) Inventor: Wim van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/527,396

(22) Filed: Oct. 29, 2014

(65) Prior Publication Data

US 2015/0222382 A1 Aug. 6, 2015

(30) Foreign Application Priority Data

Nov. 21, 2013 (EP) .................................... 13193821

(51) Int. Cl.
| | | |
|---|---|---|
| *H04L 27/06* | (2006.01) | |
| *H04J 11/00* | (2006.01) | |
| *H04L 27/26* | (2006.01) | |
| *H04H 20/30* | (2008.01) | |

(52) U.S. Cl.
CPC ......... *H04J 11/0066* (2013.01); *H04H 20/30* (2013.01); *H04L 27/265* (2013.01); *H04L 27/2647* (2013.01); *H04H 2201/183* (2013.01)

(58) Field of Classification Search
CPC .... H04B 1/12; H04H 20/30; H04H 2201/183; H04J 11/0066; H04L 27/2647; H04L 27/265
USPC ........................................................ 375/340
See application file for complete search history.

(56) References Cited

U.S. PATENT DOCUMENTS

| | | |
|---|---|---|
| 6,259,893 B1 | 7/2001 | Kroeger et al. |
| 6,292,917 B1 * | 9/2001 | Sinha et al. .................. 714/752 |
| 2008/0175331 A1 * | 7/2008 | Kroeger ....................... 375/261 |
| 2012/0328057 A1 * | 12/2012 | Kroeger et al. .............. 375/343 |

OTHER PUBLICATIONS

B.W. Kroeger and P.J. Peyla, "Compatibility of FM Hybrid In-Band On-Channel (IBOC) System for Digital Audio Broadcast," IEEE Transactions on Broadcasting, vol. 43, No. 4, pp. 421-430, Dec. 1997.*
National Radio Systems Committee (NRSC) NRSC-5-C; "NRSC-5-C, In-band/on-channel Digital Radio Broadcasting Standard" (Sep. 2011).
iBiquity Digital; "HD Radio ™ Air Interface Design Description Layer 1 FM"; Doc No. SY_IDD_1011sG Rev. G (Aug. 23, 2011).
iBiquity™ Digital Corporation; "Transmission Signal Quality Metrics for FM IBOC Signals", Doc. No. SY_TN_26465, Rev. 02 (Aug. 24, 2011).

(Continued)

*Primary Examiner* — Nader Bolourchi

(57) ABSTRACT

The invention provides a reception method and apparatus which provides a series of frequency shifts and filtering operations to sideband signals (lower, upper, and middle), to enable detection if the central part of a signal is analog or digital, and to enable effective co-channel interference compensation. The invention enables (H)IBOC signals for example to be processed with a narrower bandwidth and therefore a lower processing clock speed and complexity is made possible compared to the conventional (H)IBOC-signal processing approach.

15 Claims, 8 Drawing Sheets

(56) References Cited

OTHER PUBLICATIONS

Proakis, John G. et al; "Digital Communications" $5^{th}$ Edition; McGraw-Hill Higher Education; 18 pages (2008).
Extended European Search Report for application EP 13193821.9 (May 6, 2014).

* cited by examiner

OFDM SIGNAL PROCESSING METHOD AND APPARATUS

CROSS-REFERENCE TO RELATED APPLICATIONS

This application claims the priority under 35 U.S.C. §119 of European patent application no. 13193821.9, filed on Nov. 21, 2013, the contents of which are incorporated by reference herein.

FIELD

This invention relates to the processing of an Orthogonal Frequency-Division Multiplexing (OFDM) signal comprising a central part centered on a carrier frequency, a lower sideband below the lowest frequency of the central part and an upper sideband above the highest frequency of the central part. The invention relates in particular to the "In-band on-channel" (IBOC) radio transmission system. This system is generally used to transmit digital radio and analog radio broadcast signals simultaneously on the same frequency. There is also an all-digital version in which two digital signals are combined. The term (H)IBOC is used to refer to an IBOC signal which can be in hybrid or all digital form.

BACKGROUND

The in-band on-channel digital radio broadcasting standard for the Frequency Modulation (FM) band is defined by the FM-part of the NRSC-5 standard "National Radio Systems Committee (NRSC) NRSC-5-C, "In-band/on-channel Digital Radio Broadcasting Standard", September, 2011". This standard is referred to below as REF [1]. Moreover, REF [1] is the basis for the transmitted IBOC signals of the digital corporation iBiquity™ that can be received by an HDradio certified receiver.

The basics of this standard are discussed below, based on some of the corresponding documents belonging to REF [1] and specifically document; "*HD Radio™ Air Interface Design Description Layer 1 FM*", Doc. No.: SY_IDD_1011sG Rev. G, Aug. 23, 2011. This document is referred to below as REF [2].

One type of IBOC signal is the so-called "Hybrid IBOC FM" signal, which is denoted "Hybrid IBOC" in this document.

FIG. 1 shows this hybrid signal in simplified form. The hybrid signal is a combination/addition of an analog FM-signal and a digitally-modulated signal. The analog FM-signal 10 occupies a bandwidth of 200 kHz, i.e., between −100 kHz and +100 kHz separated from the carrier-frequency. The digitally-modulated signal occupies a bandwidth of roughly 200 kHz. However, the digitally-modulated signal is separated into a lower-sideband 12 and an upper-sideband 14 both with a bandwidth of roughly 100 kHz. The lower-sideband is spectrally positioned at a distance of 100 kHz below the carrier-frequency. The upper side-band is spectrally positioned at a distance of 100 kHz above the carrier-frequency.

Each digital sideband comprises a set of a maximum of 14 partitions depending on the service mode. Each partition has 19 subcarriers. Depending on the service mode the number of partitions is 10, 11, 12, or 14.

The total power of the digitally-modulated signal is approximately a factor of hundred smaller than the power of the analog host-FM-signal. The hybrid IBOC signal can be seen as a sort of noisy FM signal.

In addition, the digitally-modulated signal uses OFDM, where the number of subcarriers can vary depending on the selected service/transmission-mode. The so-called "channel-grid" (the reserved channel-bandwidth for an analog FM-signal) is 200 kHz. As a consequence, the lower and upper digital OFDM-sidebands are using the $1^{st}$ adjacent lower, and upper neighboring FM-channels.

Another type of IBOC signal is an all-digital implementation. For the all-digital IBOC FM signal, the analog FM-signal is replaced by a (secondary) digitally-modulated signal. In the all-digital mode the bandwidth of the primary digital sidebands is fully expanded with lower-power secondary sidebands. In particular the number of OFDM subcarriers is increased to 1093.

FIG. 2 shows the spectrum plot of the all-digital IBOC signal. This is denoted "all-digital IBOC" in this document. The term (H)IBOC is used to refer to a system compatible with both signals.

The all-digital IBOC signal has a bandwidth of roughly 400 kHz, where also in the all-digital mode approximately 100 kHz of the lower and upper adjacent channels is occupied (outside the 200 kHz "channel-grid").

The lower digital sideband is shown as 20 and the upper digital sideband is shown as 22. Each has a primary section 20a, 22a and a secondary section 20b, 22b. Each primary section and each secondary section is formed of 10 main (M) frequency partitions and 4 extended (E) frequency partitions each of 19 subcarriers. The secondary partitions 20b, 22b also have a protected partition (P) each of 12 subcarriers.

Note that the digital parts 12, 14 in FIG. 1 take the form of the primary sidebands 20a, 22a as shown in more detail in FIG. 2. However, in the hybrid-mode the number of extended frequency partitions can be; 0, 1, 2, or 4 depending on the transmitted service mode.

The table below is the table in Section 3.5 of REF [2] that defines the FM-system parameters for the OFDM-symbols, the OFDM-frames, and the OFDM-blocks.

| Parameter Name | Symbol | Units | Exact Value | Computed Value (To 4 significant figures) |
|---|---|---|---|---|
| OFDM Subcarrier Spacing | $\Delta f$ | Hz | 1488375/4096 | 363.4 |
| Cyclic Prefix Width | $\alpha$ | none | 7/128 | $5.469 \times 10^{-2}$ |
| OFDM Symbol Duration | $T_s$ | s | $(1 + \alpha)/\Delta f =$ (135/128) · (4096/1488375) | $2.902 \times 10^{-3}$ |
| OFDM Symbol Rate | $R_s$ | Hz | $= 1/T_s$ | 344.5 |
| L1 Frame Duration | $T_f$ | s | $65536/44100 = 512 \cdot T_s$ | 1.486 |
| L1 Frame Rate | $R_f$ | Hz | $= 1/T_f$ | $6.729 \times 10^{-1}$ |
| L1 Block Duration | $T_b$ | s | $= 32 \cdot T_s$ | $9.288 \times 10^{-2}$ |
| L1 Block Rate | $R_b$ | Hz | $= 1/T_b$ | 10.77 |
| L1 Block Pair Duration | $T_p$ | s | $= 64 \cdot T_s$ | $1.858 \times 10^{-1}$ |

-continued

| Parameter Name | Symbol | Units | Exact Value | Computed Value (To 4 significant figures) |
|---|---|---|---|---|
| L1 Block Pair Rate | $R_p$ | Hz | $= 1/T_p$ | 5.383 |
| Digital Diversity Delay Frames | $N_{dd}$ | none | 3 = number of L1 frames of diversity delay | 3 |
| Digital Diversity Delay Time | $T_{dd}$ | s | $= N_{dd} \cdot T_f$ | 4.458 |
| Analog Diversity Delay Time | $T_{dd}$ | s | $= 3.0 \cdot T_f$ | 4.458 |

As can be seen from this table the OFDM-subcarrier spacing is defined as:

$$\Delta f \stackrel{def}{=} \frac{1488375}{4096} \approx 363.4 \text{ Hz}.$$

The appropriate sampling-frequency for the OFDM-symbols as a function of the FFT-length can be written as, $F_c = N^* \Delta f$, where N is the FFT-length. The total number of OFDM-subcarriers in the all-digital case is $2*546\pm1=1093$. Note that in the hybrid mode (FIG. 1) only, at most $2*267$ of active OFDM-carries are used/available. To perform efficient FFT and IFFT operations a radix-2 kind of FFT is preferable, which means that the (I)FFT length needs to be:

$$N = 2^n \geq 1093 \rightarrow 2048 = 2^{11} \geq 1093 \rightarrow N = 2048.$$

The appropriate sampling-frequency becomes now:

$$F_c = 2048 * \frac{1488375}{4096} = \frac{1488375}{2} \approx 744 \text{ kHz}.$$

In addition, in Chapter 5, Section 5.1.1.1 Table 1 of REF [1] the definition of an Audio-frame is defined as:

"The unit of information payload exchanged from the audio interface and the audio codec protocol layer. Audio frames are comprised of 2048 audio samples at a sampling rate of 44.1 kHz."

With reference to the signal-processing sampling-frequency, it is related, i.e., fixed to the audio sampling-frequency by:

$$F_c = \frac{\frac{135}{4} * 44.1e3}{2} = \frac{135}{8} * 44.1e3$$

Such a fixed relation between the signal-processing and audio sampling-frequency can be especially desirable for maintaining stable decompressed audio quality.

Furthermore, Appendix-A of iBiquity™ Digital Corporation, "Transmission Signal Quality Metrics for FM IBOC signals", Doc.No.:SY_TN_2646S Rev. 02, Aug. 24, 2011 provides suggestions for synchronization to the carrier frequency and to determine symbol timing. It shows that the signal processing for the "wide-band" approach operates with an (radix-2) FFT size of 2048 points on the corresponding clock speed of:

$$F_c = \frac{1488375}{2} = \frac{135}{8} * 44.1e3 = 744187.5$$

Thus, it can be concluded that for the conventional "wide-band" (H)IBOC FM-receiver a 2048 points FFT at a sampling-frequency of $\approx 744$ kHz is applied.

The digitally-modulated OFDM-signal only occupies roughly 200 kHz or 400 kHz with a maximum of 534, or 1093 subcarriers respectively, so that a sampling-frequency of $\approx 744$ kHz and a 2048 points FFT is rather large, i.e., "wide-band". Consequently, with the sampling-frequency or clock-speed of $F_c \approx 744$ kHz and the FFT-size of 2048, the "wide-band" conventional (H)IBOC approach, e.g., suggested by iBiquity (Trade Mark), will process the relatively small digitally-modulated OFDM spectrum with a processing-bandwidth (i.e., fundamental-interval) of:

$$B_w = \pm \frac{1488375}{4} \approx \pm 372 \text{ kHz}$$

Even in the all-digital case the all-digital IBOC FM-spectrum will not exceed a bandwidth of $B_w \approx \pm 200$ kHz, as can also be seen from FIG. 2. Thus, according to the Nyquist sampling-theorem, a sampling-frequency of $F_c \geq 400$ kHz should be sufficient to process and be able to fully recover the digitally-modulated OFDM-signals.

These observations form the basis of this invention, which aims to provide a "narrow-band" alternative for the conventional "wide-band" (H)IBOC FM-receiver.

SUMMARY

The invention is defined by the claims.

According to one aspect of the invention, there is provided a method of processing of a (H)IBOC signal comprising a central part centered on a carrier frequency, a lower sideband below the lowest frequency of the central part and an upper sideband above the highest frequency of the central part, the method comprising:

determining if the central part is analog or digital;

initial frequency shifting of the lower sideband to be immediately above the carrier frequency and of the upper sideband to be immediately below the carrier frequency;

filtering the initial frequency-shifted signals and performing co-channel interference compensation;

further processing the initial frequency-shifted signals and combining them to derive a first reconstructed signal if the central part is analog and a second reconstructed signal if the central part is digital;

performing sample rate conversion of the first or second reconstructed signal to lower the sampling frequency to a lowered sampling frequency which depends on whether the central part is analog or digital;

FFT processing a selected signal; and

OFDM processing the FFT processed signal.

In this method, the removal of the 1$^{st}$ adjacent FM-distortions by the co-channel interference compensation (CIC) and the OFDM processing are treated separately. This means they can be processed at optimal clock-speeds.

The OFDM processing after the FFT processing preserves orthogonality. Lowering the clock-speed in the sample rate conversion step is possible to specific sampling-frequencies since the orthogonality of the transmitted HIBOC signal needs to be preserved.

The initial frequency shifting enables, in the hybrid-mode, the removal of the analog part. It also allows removal of 1$^{st}$ adjacent FM-distortions in the hybrid-mode as well as in the all-digital mode, i.e. it enables the subsequent co-channel Interference compensation (CIC).

Detecting if the central part is analog or digital can comprise low pass filtering and detection of a $\chi^2$-distribution of the second moment of the signal.

The co-channel interference compensation addresses the issue of interference from first adjacent channels, i.e., interference due to the 1$^{st}$ adjacent FM-distortion on the lower-sideband and upper-sideband.

The co-channel interference compensation can comprise blending of an uncompensated (clean) version with a compensated version in dependence on the level of interference.

Preferably, if the central part is analog, the further processing comprises:

second frequency shifting of the lower sideband to be centered on the carrier frequency and of the upper sideband to be centered on the carrier frequency;

filtering the second frequency-shifted signals for channel selectivity and removal of an out-of-band residual of the co-channel interference compensation;

third frequency shifting of the lower sideband to be at a specific frequency above the carrier frequency and of the upper sideband to be at a specific frequency below the carrier frequency; and combining the third frequency shifted upper and lower sidebands to derive the first reconstructed signal.

This step provides moving of the side-bands inwards when a hybrid signal is detected. This is possible because 1$^{st}$ adjacent CIC is performed separately from the OFDM-processing to preserve orthogonality of the transmitted HIBOC-signals. This movement of sidebands is spectrally the most efficient that can be achieved, based on the Nyquist criterion. However, this is not straightforward if there is interference, in particular from the first adjacent distortions of neighboring frequency channels and also from interference from the host carrier signal.

The filtering of the second frequency-shifted signals in the hybrid-mode enables CIC-residuals removal and this filtering also provides the channel-selectivity in the hybrid-mode. This extra CIC-residual removal desired in the hybrid-mode is due to the fact that in this hybrid-mode the side-bands are very close to each other.

The third frequency shifting is used to aid synchronization and channel-estimation.

The method can comprise performing channel selectivity filtering (after the sample rate conversion) if the previous filtering operations are not sufficient for this purpose.

The method enables the sample rate conversion to be from 650 kHz to ≈232 kHz for the hybrid signals. The FFT processing clock speed can be ≈232 kHz using a 640 point FFT.

In the case of OFDM signals, the reduction of the bandwidth should not distort/disrupt the orthogonality of the OFDM-signal, i.e., the OFDM-signal processing should be on a clock-speed that fits to the OFDM-symbol period, this is how the ≈232 kHz value is computed.

For a (H)IBOC-signal in which the central part is detected as digital, the initial frequency shifting of the lower sideband to be immediately above the carrier frequency is also for the removal of the 1$^{st}$ adjacent FM-distortions, i.e., the co-channel interference compensation (CIC), as mentioned above.

For all-digital signals, the further processing can comprise:

return frequency shifting of the upper and lower sidebands back to their original frequency positions; and combining the return frequency shifted upper and lower sidebands and a filtered central part to derive the second reconstructed signal.

The return frequency shifting is performed since the upper and lower side-bands needed to be shifted to perform the CIC operation.

The return frequency shifted upper-sideband, and lower-sideband are combined with the filtered middle-band (the central part of the signal). In the all-digital mode the central part contains the secondary OFDM-signals and needs to be restored, unlike in the hybrid-mode.

For the all-digital case, the method of separation of the CIC from the OFDM-signal processing allows a sample rate conversion from 650 kHz to ≈465 kHz for the all-digital mode. The FFT processing clock speed for the all-digital signal can be ≈465 kHz with a 1280 point FFT.

The known processing for the all-digital mode of an OFDM IBOC signal makes use of an FFT-size of 2048 points, to preserve the OFDM-symbol orthogonality. This means that the clock-speed needs to be around 744 kHz.

However, to remove the first adjacent neighboring signals, the clock-speed needs to be at least 600 kHz, which is also achieved with the conventional 744 kHz clock-speed and the according 2048 points FFT-size.

However, to process in the all-digital mode a clock-speed (Nyquist-rate) of only 400 kHz (or more) is required, i.e., the bandwidth of the OFDM-signal in the all-digital-mode. The invention thus enables, for the all-digital mode, a reduced clock-speed of ≈465 kHz with the corresponding FFT-size of 1280-points (=5×256). This is an efficient FFT-size for implementation, and indeed the most efficient after sizes of 2$^n$, to preserve the orthogonality of OFDM-symbols and to process OFDM signals further.

In the newly-developed method the removal of the 1st-adjacent channel distortions, i.e., the CIC-operation, and the OFDM-processing are performed separately, i.e. not joined in the same clock-domain. Thus, the already low (almost optimal) clock-speed of 650 kHz for the CIC is too high for the for the OFDM-processing and by separation of the CIC-processing and the OFDM-processing as proposed by the invention, both these operations can be implemented with multiple clock speeds that fit best each operation.

The invention also provides a (H)IBOC signal processor for processing of a signal comprising a central part centered on a carrier frequency, a lower sideband below the lowest frequency of the central part and an upper sideband above the highest frequency of the central part, the processor comprising:

a detection circuit for detecting if the central part is analog or digital based on the central part;

a first frequency shifting element for initial frequency shifting of the lower sideband to be immediately above the carrier frequency, a first filter for filtering of the lower sideband and a first co-channel interference compensation unit for the lower sideband;

a second frequency shifting element for initial frequency shifting of the upper sideband to be immediately below the carrier frequency, a second filter for filtering of the upper sideband and a second co-channel interference compensation unit for the upper sideband;

a third filter for filtering out the central part;

a first combiner for combining the upper and lower sidebands to derive a first reconstructed signal if the central part is analog;

a second combiner for combining the upper and lower sidebands and the central part to derive a second reconstructed signal if the central part is digital;

for the first reconstructed signal, a first sample rate converter arrangement to lower the sampling frequency, a first FFT processor arrangement for processing a selected signal and a first OFDM processor arrangement; and for the second reconstructed signal, a second sample rate converter arrangement to lower the sampling frequency, a second FFT processor arrangement for processing a selected signal and a second OFDM processor arrangement.

The processor can comprise (for the hybrid mode):

a third frequency shifting element for frequency shifting of the initially frequency shifted lower sideband to be centered on the carrier frequency and a fourth filter for performing the removal of the out-of-band residuals of the co-channel interference compensation;

a fourth frequency shifting element for frequency shifting of the initially frequency shifted upper sideband to be centered on the carrier frequency and a fifth filter for performing the removal of the out-of-band residuals of the co-channel interference compensation;

a fifth frequency shifting element for further frequency shifting of the lower sideband to a specific frequency above the carrier frequency; and a sixth frequency shifting element for further frequency shifting of the upper sideband to a specific frequency below the carrier frequency, wherein the fifth and sixth frequency shifted sidebands are provided to the first combiner.

The fifth and sixth frequency shifting elements are to aid synchronization and channel estimation. By frequency shifting to a specific starting frequency, it becomes possible to have (H)IBOC reference-carriers at spectrally equidistant frequency spacing. The specific spectral positions of these (H)IBOC reference carriers can provide via a small 32-point IFFT information about the channel-impulse response (CIR). This CIR can then be used to aid the synchronization and channel-estimation.

BRIEF DESCRIPTION OF THE DRAWINGS

Examples of the invention will now be described in detail with reference to the accompanying drawings, in which.

DETAILED DESCRIPTION

Figure 1:
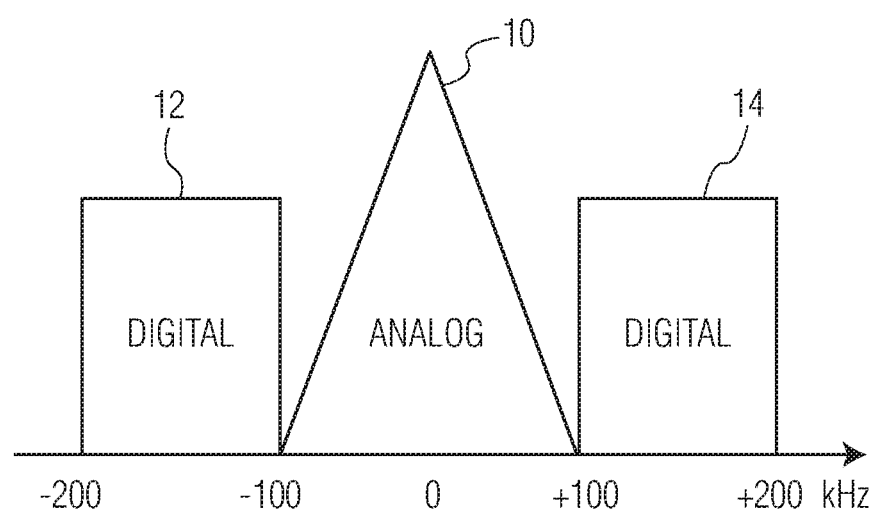
FIG. 1 shows in simplified form the structure of a hybrid IBOC signal.

The invention provides a "narrow-band" receiver concept for example for receiving in-band/on-channel ("IBOC") digital radio broadcasting standard signals, i.e., according to the FM-part of the NRSC-5 standard of REF[1].

The proposed "narrow-band" receiver concept of the invention enables the digitally-modulated signal of the received signals in hybrid IBOC or in all-digital IBOC mode to be processed based on approximately 30% or 60% (respectively) of the clock-speed compared to the required clock-speed of a conventional "wide-band" (H)IBOC receiver. In addition, the OFDM-symbol sizes, i.e., the number of samples that are required to represent an OFDM-symbol, are reduced to the same fractions 30% and 60% for the hybrid and all-digital transmission mode respectively, of the (H)IBOC signals. However, the "narrow-band" approach of the invention aims to maintain the reception quality compared to the conventional "wide-band" approach.

The invention provides a reception method and apparatus which provides a series of frequency shifts and filtering operations to the sideband signals, to enable detection if the central part of the IBOC signal is analog or digital, and to enable effective co-channel interference compensation (CIC) by filtering and to enable effective OFDM signal processing. For a hybrid IBOC signal, the signals are processed with a narrower bandwidth, made possible by separation of the CIC and the OFDM-processing, and therefore a lower processing clock speed and complexity is made possible. For the all-digital IBOC signal the clock-speed and complexity are lowered by separation of the CIC and the OFDM-processing.

The "narrow-band" (H)IBOC receiver concept of the invention can be implemented based on nine main-steps which enable a transmitted (H)IBOC signal to be received in a "narrow-band" setting. The invention can be described as a "narrow-band" approach because the maximum-bandwidth required for processing the OFDM-signal occupies roughly 400 kHz bandwidth compared to the wideband receiver approach that occupies roughly 750 kHz bandwidth for processing the OFDM-signal. The approach of the invention is not restricted to the hybrid-mode but applies to the all-digital mode as well, as it can reduce the bandwidth for processing the OFDM-signals in both cases.

This invention relates in particular to the digitally-modulated part, i.e., the OFDM-part of the (H)IBOC signals, since in the hybrid-mode the "host-FM" signal is processed in the analog part of the (H)IBOC FM-receiver. In addition, the front-end of the (H)IBOC FM-receiver might deliver the (H)IBOC signal as a complex discrete baseband signal at a particular sampling-frequency, e.g., 650 kHz. This particular sampling-frequency should be higher than 600 kHz to be able to remove a possible $1^{st}$ adjacent FM-interference on the upper- and lower-sidebands.

One detailed example of the invention will be described below. The main steps of this detailed method for processing the (H)IBOC signal in a "narrow-band" setting are:

1. Hybrid or all-Digital Detection:

Since the digitally-modulated OFDM-signals occupy different bandwidths in the hybrid or all-digital mode, a first step is to examine and establish if the received (H)IBOC FM-signal is transmitted in hybrid or in all-digital mode. The detection if the received signal is a hybrid or an all-digital IBOC signal is based on second order statistics of the received signal and (relaxed) low-pass filtering to remove possible $1^{st}$ adjacent FM-interferences on the upper- or lower-sidebands to aid the reliability of the detection, which is based on the central-part of the received IBOC-signal. The central-part for hybrid or all-digital detection can for example be obtained by a (relaxed) 13 taps filter.

2. Lower-Sideband Shifted and Filtered:

A specific spectral shift of the lower-sideband to the positive frequencies is required to prevent that the lower-sideband interferes with the upper-sideband in the narrow-band hybrid mode. The shifted frequency signal is then filtered.

In the hybrid mode this specific low-pass filtering is applied for two purposes. First it is applied to remove the lower half, i.e., negative frequencies, of the "host-FM" signal and minimize the FFT-leakage due to the "host-FM" residuals (see FIG. 5 discussed below). The removal of the "host-FM"-signal is required to create spectral-room for the upper-sideband in the narrow-band setting. Due to the shift of the lower side-band to the positive frequency of roughly 0-100 kHz, the host-FM signal is shifted to roughly 100-300 kHz. Since the aim is to process the lower sideband, it can be filtered-out by a low-pass filter (of 21 taps) with a pass band at 100 kHz and a stop-band of 130 kHz.

The second purpose of the specific low-pass filtering is to apply co-channel interference compensation (CIC) to compensate for distortion by a $1^{st}$ adjacent FM-interference. Note that this is required for the hybrid mode and for the all-digital mode. The frequency shifting and filtering is required for the CIC to be able to remove the co-channel interference, i.e., the $1^{st}$ adjacent FM-distortions that interfere with the lower side-band in the hybrid as well as in the all-digital mode.

Figure 3:
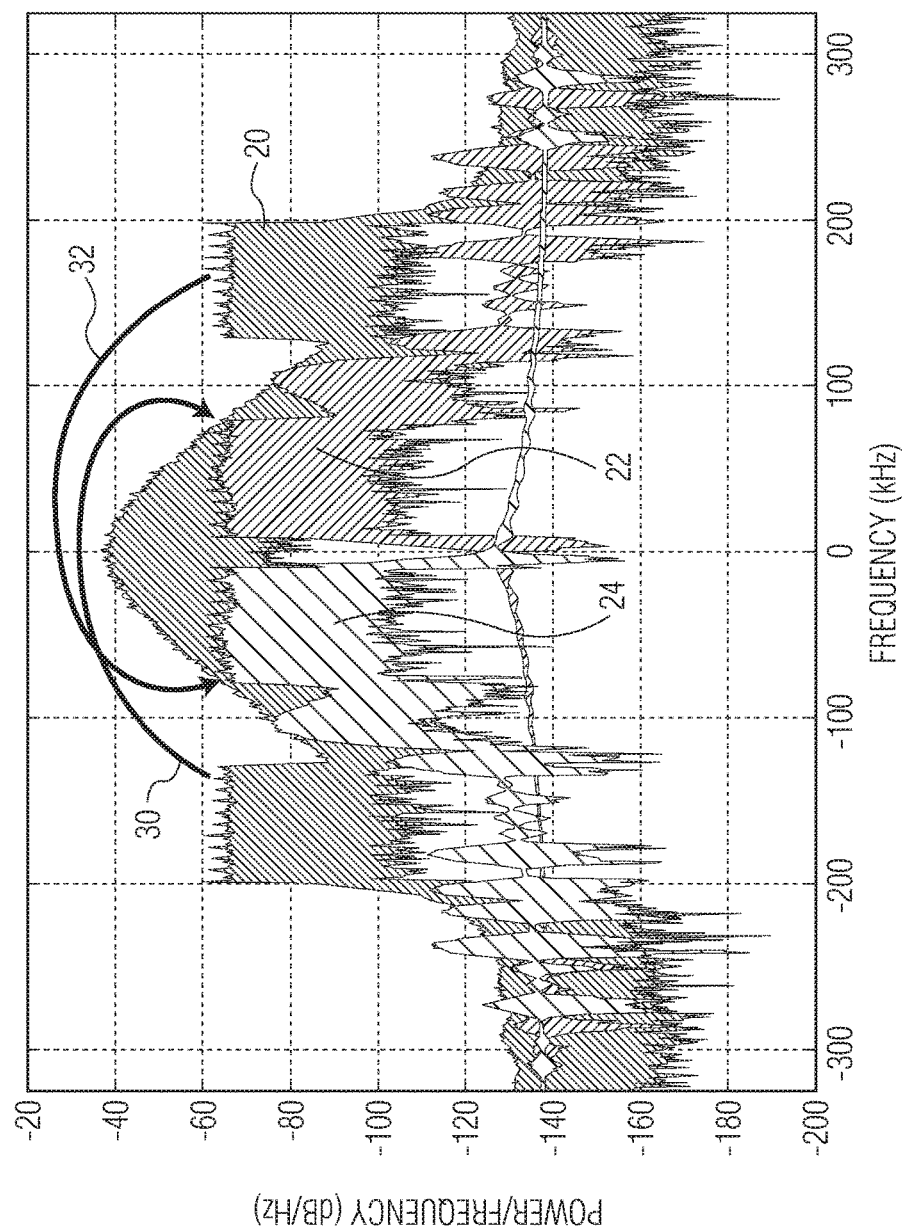
FIG. 3 shows the frequency spectrum of the hybrid IBOC signal after some of the processing steps of the invention.

FIG. 3 shows the spectrum of the hybrid IBOC-signal (for service mode MP1). Plot 20 shows the ideal hybrid IBOC signal spectrum. Plot 22 shows the lower sideband before combining take place, and plot 24 shows the upper sideband before combining take place. Arrow 30 represents the processing of the lower sideband with a shift to positive frequencies.

Note that the processing is base-band processing in the digital domain (with I/Q samples). The processing is thus around 0 Hz, and this 0 Hz represents the (down-converted) carrier-frequency. The frequencies are thus relative to the carrier-frequency, but with processing at base-band.

3. Is the $1^{st}$ Adjacent FM Interference Signal on the Lower-Sideband?

The first adjacent interference signal is the signal on the channel next to the desired/used channel. The desired channel is in the frequency range of −100 kHz to +100 kHz below and above the carrier-frequency, i.e., the central-part of the (H)IBOC-signal), thus $1^{st}$ adjacent FM-distortions are on the upper and the lower (digital) side-bands.

Blending is performed between a "clean" lower sideband signal and a lower-sideband that is compensated for a detected $1^{st}$ adjacent FM-interference signal. The blending between the clean and the compensated signal depends on how severe the $1^{st}$ adjacent FM-distortion on the lower-sideband is.

If the side-band is distorted with a $1^{st}$ adjacent FM-signal, the sideband will be a "noisy-FM" signal, i.e., a constant-modulus signal. On the other hand, if no distortion is on the sideband the received side-band signal is a digitally-modulated OFDM-signal with a Gaussian distribution for the real and imaginary components. Therefore, just as with hybrid and all-digital mode-detection, blending can be based on the recognition of a $\chi^2$-distribution of the second-moment (power) of the received distorted or non-distorted sideband. Thus, e.g., if the recognition based on the $\chi^2$-distribution gives a value that is for example equal to one then there is no $1^{st}$ adjacent distortion and the blending completely passes the clean-signal, if the recognition gives a value of roughly zero then the side-band is distorted and the blending passes the CIC-compensated signal.

4. Upper-Sideband Shifted and Filtered:

For the upper-sideband, the specific spectral shift is to the negative frequencies (in step 2 the lower-sideband was shifted to the positive frequencies) to prevent the upper-sideband to interfere with the lower-sideband in the narrow-band hybrid mode. This is represented by arrow 32 in FIG. 3.

The specific low-pass filtering again serves in hybrid mode two purposes namely (i) to remove the upper half of the "host-FM" to create spectral-room for the lower-sideband and minimize the FFT-leakage (again see also FIG. 5) and (ii) to apply CIC to combat a $1^{st}$ adjacent FM-interference on the upper side-band. The latter is required for the hybrid as well as the all-digital mode 5. Is the $1^{st}$ Adjacent FM Interference Signal on the Upper-Sideband?

Blending for the upper-sideband is performed in a similar way as for the lower-sideband described by step 3. However the blending depends in this case on the severity of the FM-distortion on the upper-sideband.

The upper and lower sidebands are thus processed in the same way.

The shifting and then filtering is performed to be able to apply the CIC both for the all-digital and hybrid modes. For the hybrid mode, to be able to do the CIC function the filtering after the shifting additionally provides filtering out of the "host" FM signal.

6. Construction of the "Narrow-Band" Hybrid or all-Digital IBOC Signal:

For (re)construction of the (H)IBOC signal in a narrow-band setting, different steps are performed for the hybrid and all-digital modes. Moreover, for all the remaining steps there is differentiation between the hybrid and all-digital mode.

Thus, the construction of the signal is based on the (already obtained) knowledge of whether the signal is hybrid or all digital.

6a. Hybrid-IBOC FM-Signal

The lower-sideband is spectrally shifted to a position that the lower-sideband is symmetrical around the carrier-frequency. Now specific low-pass filtering is used (i) to minimize CIC interference, i.e., FFT-leakage, i.e., (62) in FIG. 6(b) discussed below, by removal of the CIC-residuals and (ii) to prevent aliasing of the residual "host-FM" signal, and (iii) to prevent aliasing of the out of "narrow-band" components.

Similarly, the upper-sideband is spectrally shifted to a position that the upper-sideband is symmetrical around the carrier-frequency. Specific low-pass filtering is again used (i) to minimize CIC interference, i.e., FFT-leakage, by removal of the CIC-residuals and (ii) to prevent aliasing of the residual "host-FM" signal, and (iii) to prevent aliasing of the out of "narrow-band" components.

Figure 6A:
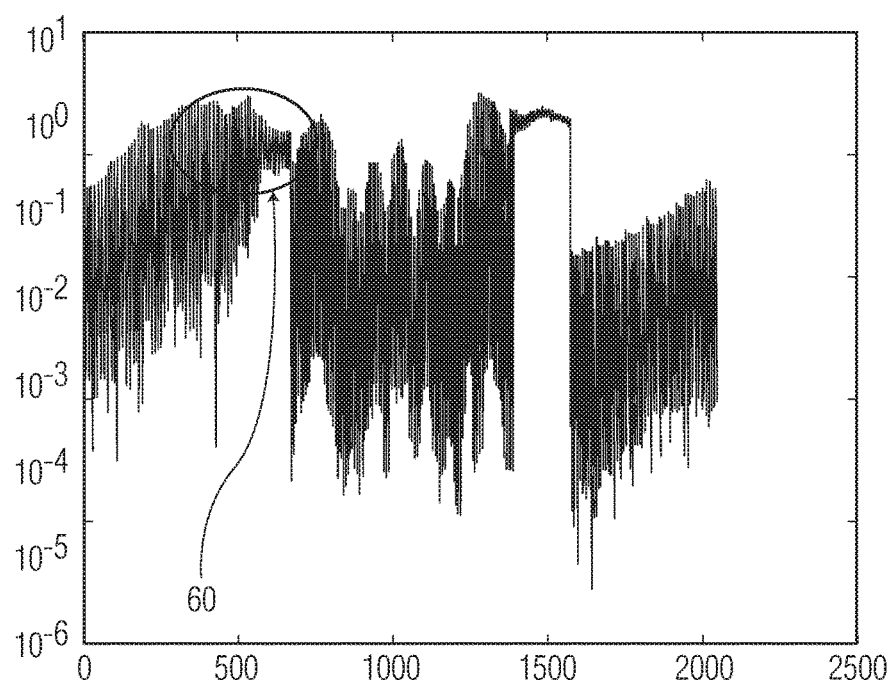
FIG. 6a shows the effect of co-channel interference compensation for a 1st adjacent on the lower-sideband on the frequency spectrum of the hybrid IBOC signal in the wideband approach and FIG. 6b shows the frequency spectrum of the hybrid IBOC signal in the narrow-band approach proposed by the invention.
Figure 6B:
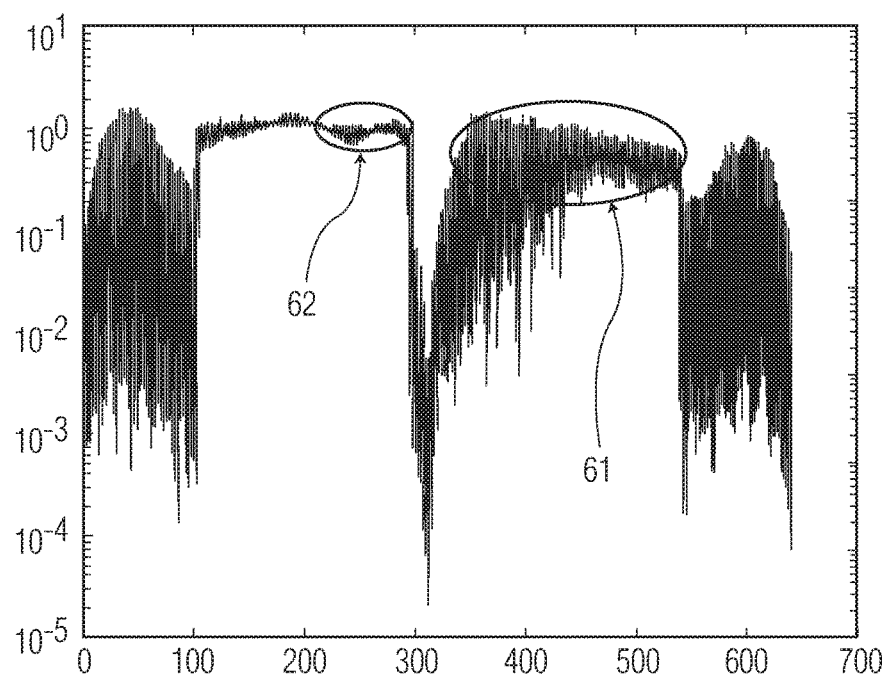

The CIC is performed for each sideband. For example FIG. 6(a) shows (for the wideband-approach) that after the CIC-operation, with a 1$^{st}$ adjacent distortion on the lower sideband, the CIC-residuals 60 on the leftmost side reside partly on the frequency below the lower sideband, i.e., the out-of-band CIC-residuals, and other residuals reside on the frequencies inside the lower-sideband, i.e., the in-band CIC-residuals. To filter the out-of-band CIC-residuals out, the lower sideband (in this example) needs to be shifted around zero and a low-pass filter (86 in FIG. 7) (37 taps) is used to remove the out-of-band CIC-residuals. The in-band CIC residuals 61 for the narrow-band approach are shown in FIG. 6(b), and these are from a 1$^{st}$ adjacent on the lower sideband. Note that the FFT-leakage 62 is due to the out-of-band residuals that are not completely removed by the low-pass filter (86 in FIG. 7).

After the CIC-residuals are removed the sideband signals are shifted a third time so that they can be combined to their final very specific frequencies.

Figure 4:
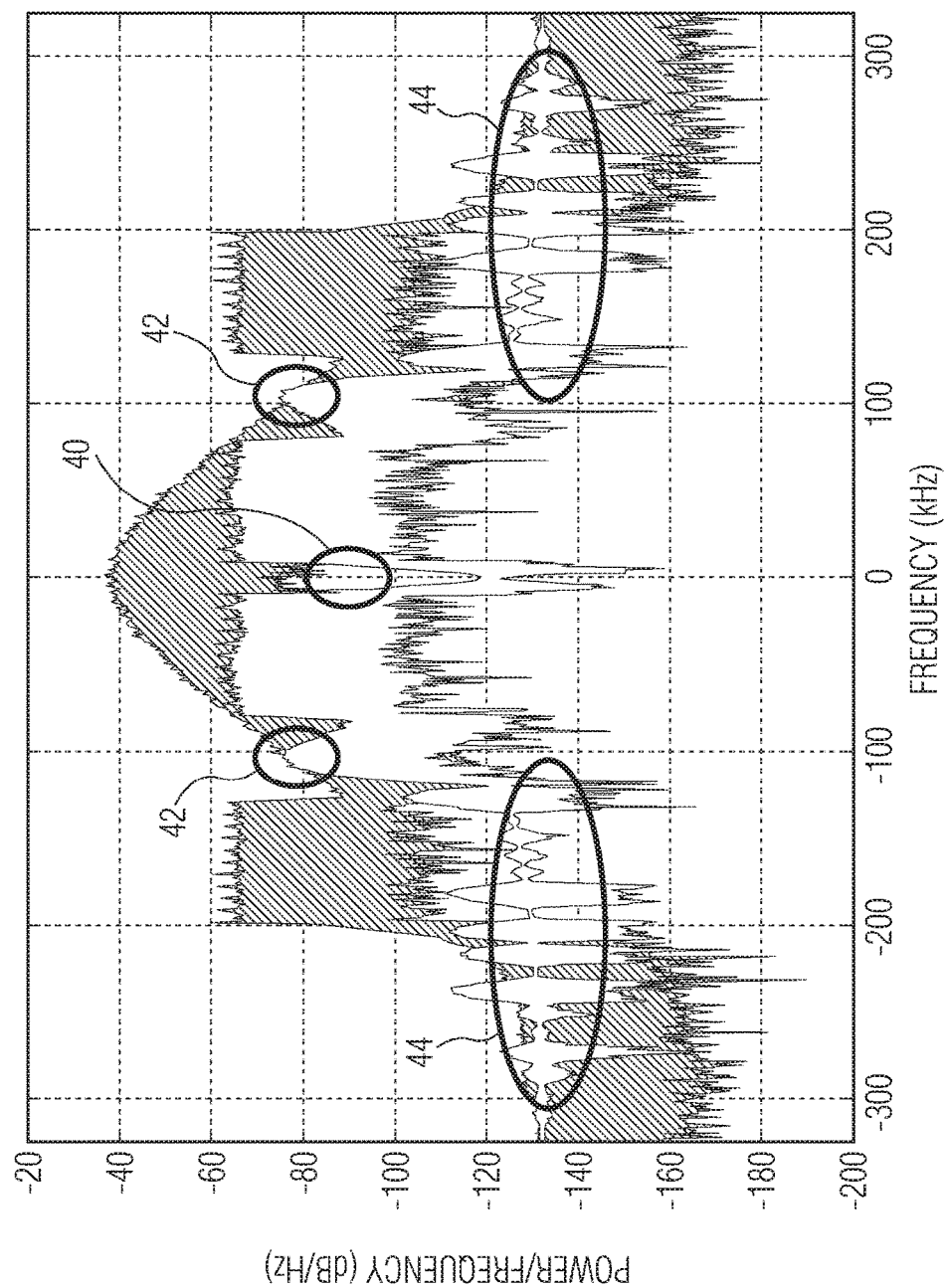
FIG. 4 shows the frequency spectrum of the hybrid IBOC signal after some further processing steps of the invention.

After combining (addition) of the appropriately newly positioned lower- and upper-sidebands the "narrow-band" hybrid IBOC signal is shown in FIG. 4. FIG. 4 shows the positioning of spectral spaces created by the shifting and filtering discussed above. Region 40 is a CIC distortion space. Regions 42 are spaces for anti-aliasing of the host FM signal. Regions 44 show low aliasing components representing out of band distortion. Thanks to the spectrally equidistant reference symbols, this approach can provide via a short IFFT (32 points) a channel impulse response to aid synchronization and channel estimation.

CIC-residuals of a 1$^{st}$ adjacent interferer on the lower-sideband are only at the lower (i.e., larger negative) frequencies partly inside (e.g., 61 in FIG. 6(b)) and partly outside the bandwidth of the (H)IBOC signals (the FFT-leakage 62 in FIG. 6(b) is due to not perfectly removed out-of-band CIC-residuals). For an upper-band interference the CIC-residuals are only at the higher frequencies partly inside and partly outside the (H)IBOC band. Thus, the CIC residuals have been filtered. The out-of-band CIC residuals that are not completely filtered out by the (37-tap) low-pass CIC-filter (as a result of non-ideal practical CIC-filters) will spectrally fit in this CIC space 40 around zero and will cause the FFT-leakage 62 in FIG. 6(b).

6b. All-Digital IBOC Signal:

Since in the all-digital mode the central (secondary) part is also needed, a low-pass filtering on this central part is performed to separate the central part from the uncompensated lower- and upper-sidebands.

The lower-sideband, due to the CIC-operation, is (still) at the positive frequencies and needs to be spectrally shifted back to its "original", i.e., transmitted frequencies. For the upper-sideband a similar shift is performed but in the opposite direction, because this sideband was also still shifted due to the CIC-operation. Finally, the appropriately positioned lower-, central-, and upper-(side) bands are combined (added) to obtain the all-digital spectrum according to FIG. 2.

7. Sample-Rate Conversion (SRC):

7a. Hybrid IBOC Signal

With the newly developed "narrow-band" spectrum, shown by FIG. 4, a direct sample-rate conversion is applied from 650 kHz to:

$$5 * \frac{135}{128} * 44.1e3 \approx 232 \text{ kHz}.$$

The computation of this specific value is explained further below. In the hybrid-mode the sampling frequency or clock-speed of the "narrow-band" approach is:

$$5 * \frac{8}{128} = \frac{5}{16} = 0.3125 * F_c^{wide},$$

This is roughly 30% of the clock-speed of the conventional "wide-band" approach. The OFDM-processing can be carried out on this low clock-speed (almost at the Nyquist speed of 200 kHz) because the CIC-processing is separated from the OFDM-processing.

7b. All-Digital IBOC Signal:

Within the "narrow-band" setting for the all-digital signal, direct conversion is applied of the sampling-rate from 650 kHz to:

$$10 * \frac{135}{128} * 44.1e3 \approx 465 \text{ kHz}$$

The computation of this value is also explained further below. Note, in the all-digital mode the clock-speed of the "narrow-band" concept is:

$$10 * \frac{8}{128} = \frac{5}{8} = 0.625 * F_c^{wide}$$

This is roughly 60% compared to the "wide-band" approach. Again, the OFDM-processing can be run at this low clock-speed (almost the Nyquist speed of 400 kHz) because the CIC-processing is separated from the OFDM-processing.

8. Fast-Fourier Transform (FFT):

8a. Hybrid IBOC Signal:

For the "narrow-band" setting of the received hybrid IBOC signals in hybrid mode an FFT-size of 640=5×128 is required, that is a combination of a prime-factor and a power of two for efficient implementation.

8b. All-Digital Signal:

The "narrow-band" approach for processing received all-digital IBOC signals in the all-digital mode requires an FFT-size of 1280=5×256 that is again a combination of a prime-factor and a power of two for efficiency.

9. OFDM Digitally-Modulated Processing:

9a. Hybrid IBOC Signal

In the "Narrow-band" setting the lower- and upper-sidebands are placed on different frequencies than in REF [1], as a consequence, for the "narrow-band" approach specific OFDM-subcarrier indices need to be processed.

Figure 2:
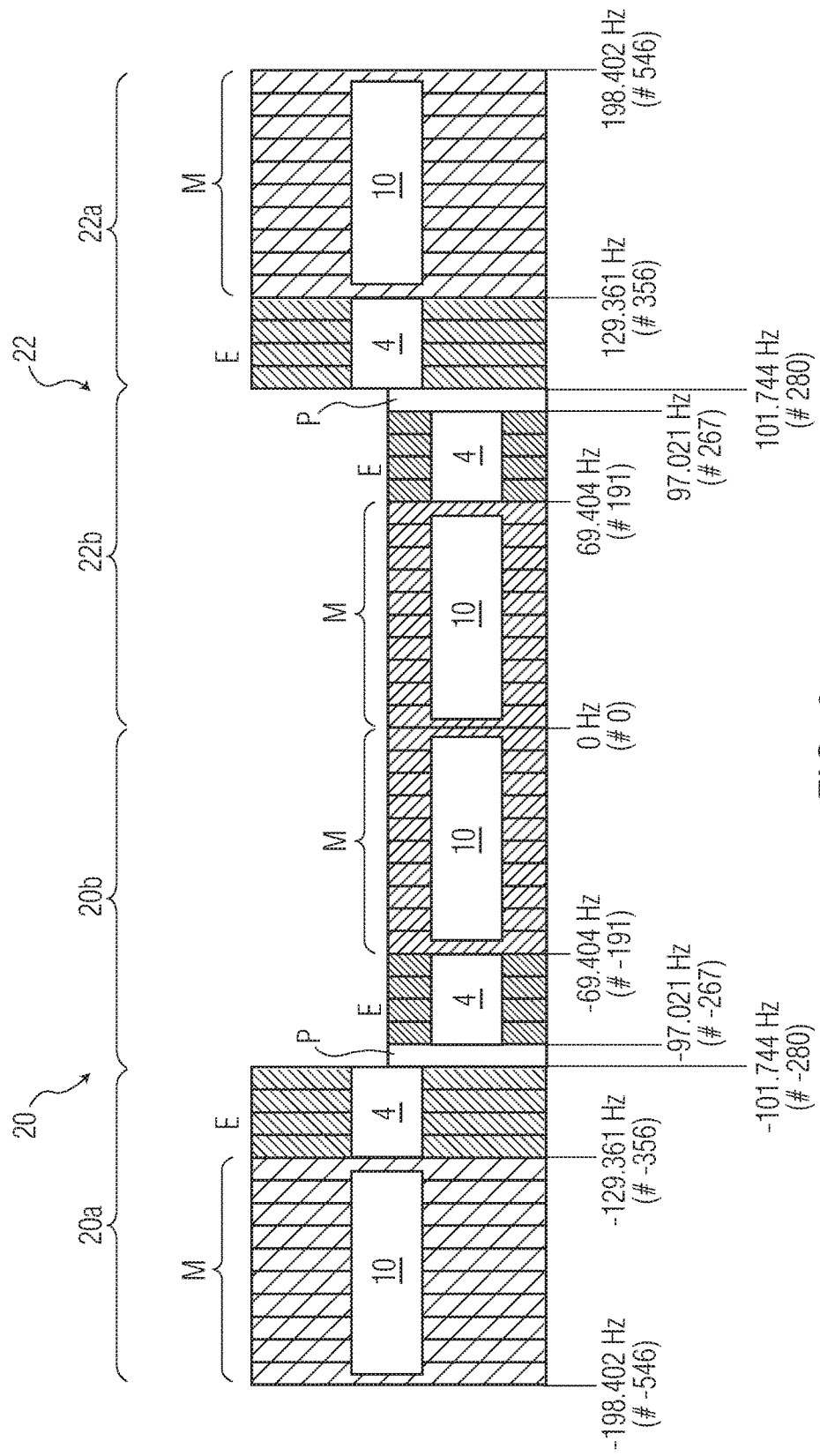
FIG. 2 shows in the structure of an all-digital IBOC signal.

9b. All-Digital IBOC Signal:

In the "narrow-band" approach the lower- and upper-sidebands are both placed back to the frequencies, i.e., subcarriers, that are conform to the standard REF [1], as shown in FIG. 2.

As mentioned above, FIGS. 3 and 4 show frequency spectrum plots (i.e., an FFT output) of the processing steps outlined above in the hybrid mode. These figures show spectra which are present for the "narrow-band" receiver and then especially for the hybrid mode, to be able to process the received HIBOC FM-signals on lower clock-speeds and with the usage of smaller OFDM-symbol buffers. In the all-digital case, the separation of the CIC processing and the OFDM processing enables to process the received IBOC FM-signals on lower clock-speeds and with the use of smaller OFDM-symbol buffers.

Figure 5A:
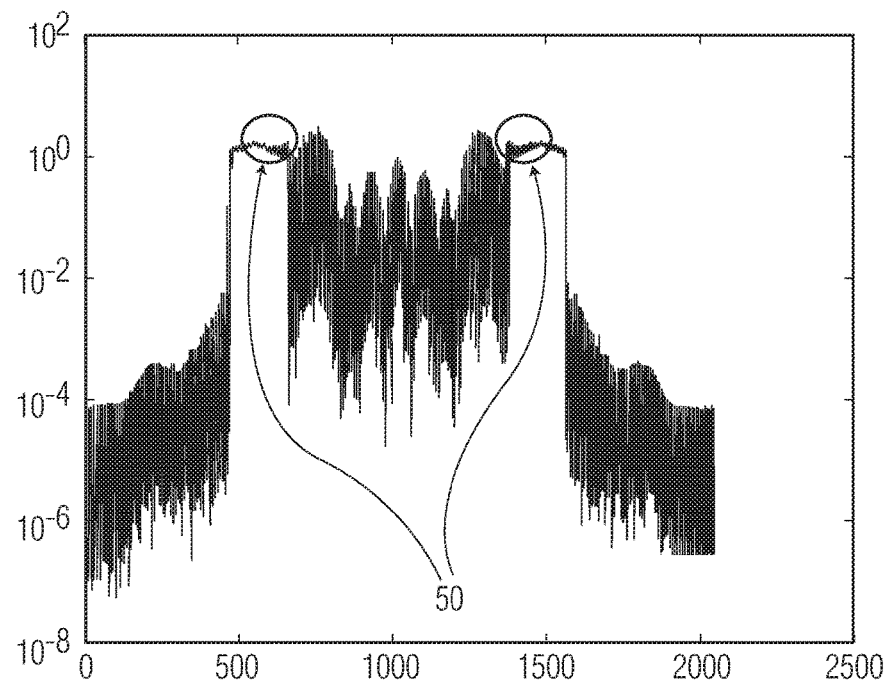
FIG. 5a shows the effect of first filtering operations on the frequency spectrum of the hybrid IBOC signal in the wideband approach and FIG. 5b shows the frequency spectrum of the hybrid IBOC signal in the narrow-band approach proposed by the invention.
Figure 5B:
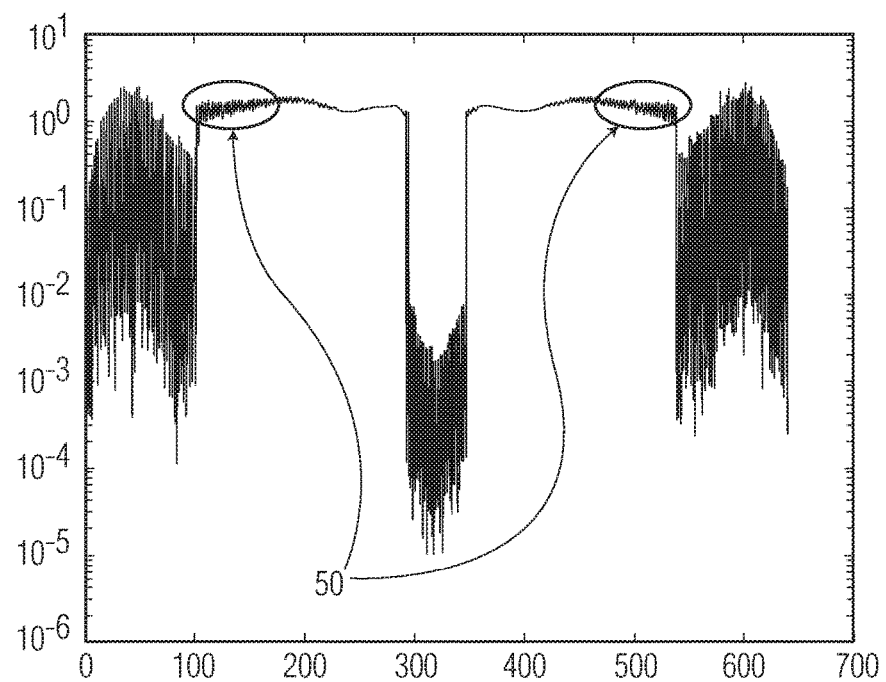

FIG. 5(a) shows the spectrum of the conventional "wide-band" approach for the Hybrid IBOC-signals and FIG. 5(b) shows the spectrum of the proposed "narrow-band" approach for the hybrid mode with FFT-leakage in the upper- and lower sidebands due to removal of the "host-FM" by low-pass filtering. This leakage is shown as 50.

The horizontal axis represents the frequency in OFDM-frequency bins (i.e., 2048 points for the "wide-band" receiver and 640 points for the "narrow-band" receiver) and the vertical axis represents the signal-amplitude per frequency-bin.

FIG. 6 shows FFT-leakage due to CIC residuals ($1^{st}$ adjacent on lower-sideband). FIG. 6(a) shows the case for the conventional "wide-band" approach and FIG. 6(b) shows the case for the proposed "narrow-band" approach.

From FIG. 6(a) it can be seen that the CIC-residuals of a $1^{st}$ adjacent FM-interference on the lower-sideband reside only at the lower frequencies partly inside and partly outside the (H)IBOC bandwidth. $1^{st}$ adjacent distortions are also possibly present in the all-digital mode, and the CIC-residuals after the CIC processing in the all-digital mode will also reside on the same frequencies as with the hybrid mode. This is of interest for appropriate removal of the CIC-residuals in different service-modes.

Figure 7:
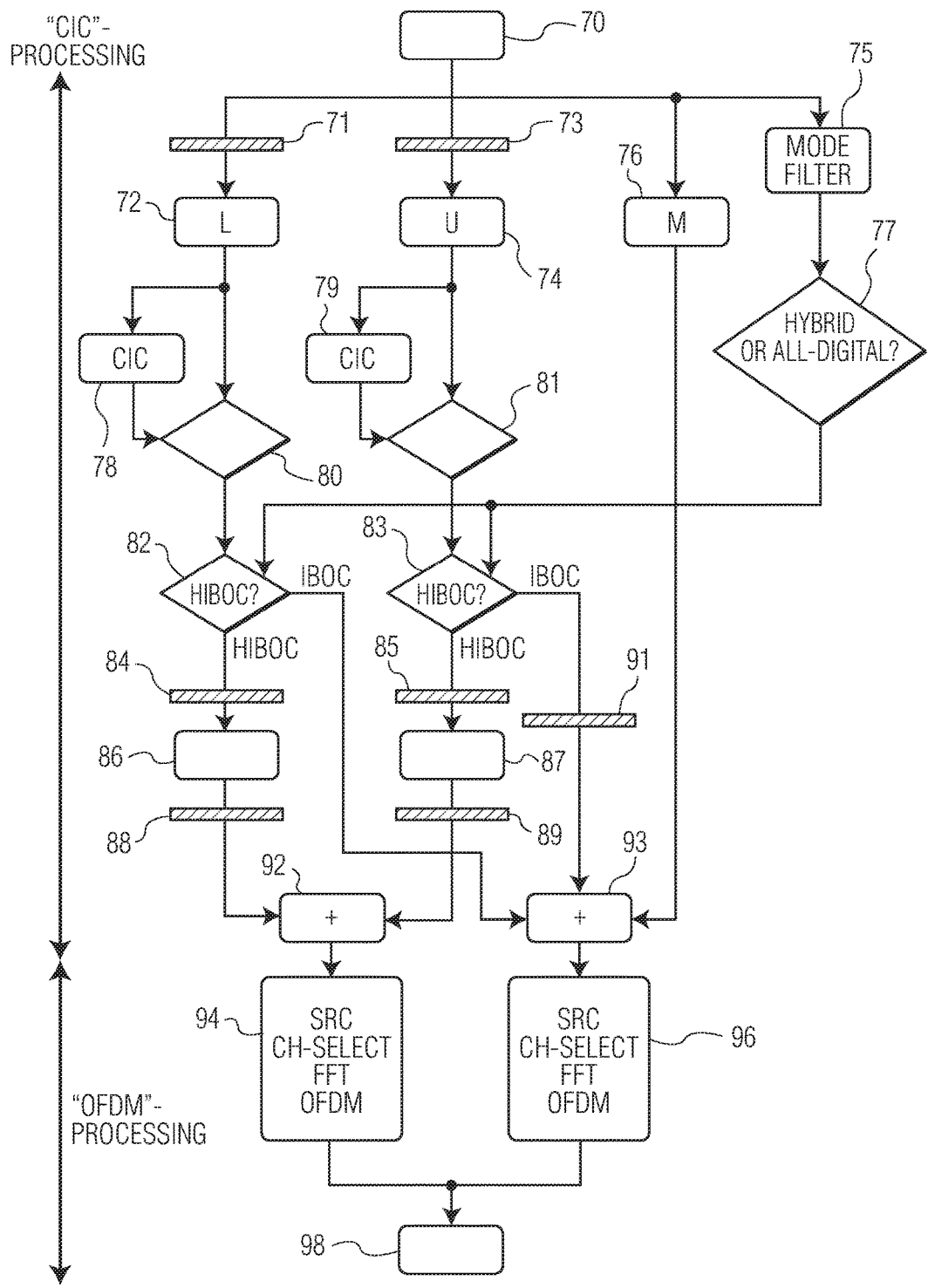
FIG. 7 is a flow chart to explain the processing method of the invention.

FIG. 6(b) shows as 61 the lower sideband after CIC and low-pass filtering (by filter 86 in FIG. 7).

FIG. 6(b) shows as 62 in the upper-sideband of the spectrum of the "narrow-band" HIBOC FM receiver the FFT-leakage due to non-perfectly removed out-of-band CIC residuals of a $1^{st}$ adjacent on the lower-sideband (the lower-sideband is at the positive frequencies). This FFT-leakage 62 was also discussed in connection with step 6 above.

The axes for FIG. 6 are the same as in FIG. 5.

A summary of the features and advantages of the "Narrow-band" concept as implemented by the method explained above is:

It is suitable for hybrid or all-digital mode detection (based on $X^2$-distribution);

It enables hybrid or all-digital mode selection;

It provides blending between lower or upper sidebands that are compensated for a $1^{st}$ adjacent distortion and lower or upper sidebands that are clean from $1^{st}$ adjacent distortions; It provides specific spectral-shifting (integer subcarrier values);

It provides adjacent (co)-channel interference compensation (CIC) for example at 650 kHz;

It provides specific frequency-selectivity due to the removal of out-of-band co-channel interference compensation (CIC) residuals by low-pass filtering because this low-pass (CIC)-filter is part of the channel-selectivity (so that the channel-selectivity filter is relaxed);

Direct sample-rate conversion is provided from 650 kHz to "narrow-band" (H)IBOC HD-Radio™ receiver (at ≈232 kHz or at ≈465 kHz);

The OFDM HIBOC signal can be processed at a clock-speed of ≈232 KHz instead of ≈744 kHz, i.e., ≈30% clock-speed;

The OFDM IBOC signal can be processed at a clock-speed of ≈465 kHz instead of ≈744 kHz, i.e., on ≈60% clock-speed;

The OFDM HIBOC can be processed with a FFT-size of 640 (5*128) instead of 2048, i.e., ≈30% symbol-size;

The OFDM IBOC can be processed with a FFT-size of 1280 (5*256) instead of 2048, i.e., ≈60% symbol-size.

Further details will now be presented relating to the filter-lengths to be used, the assigned subcarrier-indices, and the threshold settings of the "narrow-band" (H)IBOC FM-receiver concept.

FIG. 7 provides an overview of the processing-steps applied in the "narrow-band" approach as a flowchart.

The process starts in step 70.

For the lower sideband processing, the signal is spectrally shifted by unit 71 to subcarriers +1 . . . +267. For the upper sideband processing, the signal is shifted by unit 73 to subcarriers −267 . . . −1.

All spectral shifting steps in FIG. 7 are shown hatched boxes rather than full flow chart boxes, in order to keep the diagram simple.

The frequency-shifting in all cases can be performed by complex-multiplication of the received signal with the desired frequency-shift. The frequency shifting operations are carried out to enable filtering of the appropriate part of the signal.

After the (first) frequency shifting 71, the lower sideband is selected in step 72 with a 21 tap FIR (finite impulse response) LPF (low pass filter).

After the (first) frequency shifting 73, the upper sideband is selected in step 74 with a 21 tap FIR LPF.

A mode filter 75 is used for filtering the central-part of the received IBOC-signal for use in determining if the signal is hybrid or all digital. The central-part for hybrid or all-digital detection can for example be obtained by a (relaxed) 13 taps filter 75.

If the central-part is digital, the central-part is selected in step 76 with a 21 tap FIR LPF. It is around zero on subcarriers −279 to +279 so no shifting is required. The separate 13-tap filter 75 for selecting the central-part is relaxed and is provided to reduce the influence from the "non-central" part signals on the reliability of the hybrid or all-digital mode detection. The central-part is processed in step 77 to determine if the signal is all-digital or hybrid.

The hybrid or all-digital detection can use a $X^2$ distribution for this detection. The selection of the lower-, central, and upper-sideband, including possible $1^{st}$ adjacent interference signals, for further-processing is thus accomplished by spectral shifting (for the upper and lower sidebands) and low-pass linear-phase FIR filters 72,74,76 of order 20, i.e., a 21 taps FIR-filter. The pass-band of these filters is at 100 kHz and the stop-band is at 130 kHz. The filter can be implemented with a zero group-delay.

The spectral shift and filtering of the lower- and upper side band is made so as to enable CIC to be applied and, in the hybrid mode, also to remove the "host-FM" signal. The lower-sideband is shifted to the positive frequencies starting at subcarrier-index +1. Depending on the received service mode, the lower-side-band will end at subcarrier-index; +191, +210, +229, or +267. The upper-sideband is shifted to the negative frequencies and the subcarrier-indices are the negated values with respect to the lower-sideband.

Compensation for the first adjacent interferer, i.e., co-channel interference compensation (CIC) is carried out in step 78 for the lower sideband and 79 for the upper sideband. The CIC is based on the (COntinuous Look Through) COLT-principle discussed in U.S. Pat. No. 6,259,893 B1, July 2001 of iBiquity®. However, in the proposed "narrow-band" approach it runs on a sampling-frequency of 650 kHz instead of ≈744 kHz. This generates a compensated signal.

A blending step 80 for the lower sideband and 81 for the upper sideband blends an unprocessed sideband signal and the CIC compensated signal, depending on severity of interference.

The blending between the clean and the compensated signals is also based on a $X^2$ distribution in the linear domain, just as it is for the detection between the hybrid and the all-digital mode of the received (H)IBOC-signals as outlined immediately below.

In step 82 for the lower sideband and step 83 for the upper sideband, the information as to whether the signal is hybrid or all-digital is used, as derived in step 77.

In the hybrid-mode the hybrid IBOC-signal is a "noisy-FM" signal, i.e., a constant-modulus signal. On the other hand, in the all-digital mode the received all-digital IBOC signal is a digitally-modulated OFDM-signal with a Gaussian distribution for the real and imaginary components. Therefore, detection can be based on the recognition of a $\chi^2$-distribution of the second-moment (power) of the received (H)IBOC-signals. For the received (H)IBOC signals, the following parameter is defined:

$$Y = |r(t)|^2 = I(t)^2 + Q(t)^2$$

A decision-rule that the ratio between the first and second moment of Y needs to exceed a threshold of half is applied, to be recognized as an all-digital IBOC FM-signal, hence;

$$\frac{E\{Y^2\}}{(E\{Y\})^2} - 1 \Rightarrow \begin{cases} < \frac{1}{2} & \text{Hybrid} \\ \geq \frac{1}{2} & \text{All-digital} \end{cases}$$

where $E\{\cdot\}$ means the statistical average.

To minimize the influence of $1^{st}$ adjacent FM-interference on the decision a (relaxed) order 12, i.e., a 13 taps low-pass linear-phase finite impulse response filter 75 can be applied as explained above. By way of example this low-pass filter can have a pass-band at 50 kHz and a stop-band at 155 kHz.

A second lower- and upper-sideband spectral shift (steps 84,85) is then performed. These are different for the two modes.

If the hybrid-mode is detected, the lower-sideband is shifted at 84 to start at the lowest subcarrier-index −133, so that the widest lower-sideband fits (i.e., service modes; MP11, MP5, and MP6). With the same considerations, the upper-sideband is shifted at 85 to end at the highest subcarrier-index +133. These shifts to the lowest and highest subcarrier-index for the lower-, respectively, upper-sideband are an appropriate approach to remove the out-of-band CIC-residuals, because for a $1^{st}$ adjacent on the lower- or upper-sideband, the CIC-residuals will be at the lower or higher frequencies respectively partly outside and partly inside the hybrid IBOC band.

This is also shown in FIG. 6(*a*), where the CIC-residuals of a $1^{st}$ adjacent on the lower-sideband are clearly visible at the lower frequencies partly outside and partly inside the bandwidth of the hybrid IBOC signal.

In the hybrid-mode a second low-pass filter is applied in step 86 on the lower-sideband and a second low-pass filter is applied in step 87 on the upper-sideband to remove out-of-band CIC residuals and implicitly provide channel-selectivity. These filters are linear-phase FIR filters of 37-taps with a pass-band at 136 subcarriers and a stop-band at 160 subcarriers.

Steps 86 and 87 are followed by a third lower- and upper-sideband spectral shift 88,89. These spectral shifts are applied to position the lower-sideband and the upper-sideband on their final spectral-positions starting at subcarrier-index +28 and −29 respectively. This specific spectral-positioning serves multiple purposes; (i) it provides space around the carrier-frequency (DC, subcarrier 0) for the CIC-distortion, (ii) it provides "host-FM" anti-aliasing space at the lowest and highest frequencies within the bandwidth occupied by the "narrow-band" FM-receiver, (iii) it provides low out-of-band aliasing components and, (iv) thanks to the (spectrally) equidistant reference symbols it can provide, via a short (32-points) IFFT, a Channel Impulse Response (CIR), which can aid synchronization and channel-estimation.

The final spectrum of the "narrow-band" FM-receiver after hybrid mode combining in step 92 is that shown in FIG. 4.

In the case of the all-digital mode, the lower-sideband is shifted back to the (original) subcarrier-indices −546 and −280 and the upper-sideband to subcarrier indices +280 and +546. These shifts are carried out in step 90,91, followed by digital mode combining with the central-part in step 93.

All the signal-processing is already in the discrete domain (filtering, shifting, and CIC operations) that this is running on a clock speed of 650 kHz in the narrow-band approach, and on roughly 744 kHz in the wideband approach. Note that the discrete-signal processing to this point is completely separate from the required discrete-signal processing in the subsequent steps 94 and 96.

Steps 94 and 96 comprise sample rate conversion, (optional) channel-selectivity filtering, N-points FFT processing and OFDM processing. The process ends in step 98. Note that channel-selectivity filtering may not be required as the CIC filtering already carried out provides channel selectivity.

The sampling-frequency or clock-speed to process the digitally-modulated OFDM part could theoretically be, for the proposed "narrow-band" approach, just above 200 kHz for the hybrid-mode and just above 400 kHz for the all-digital mode. However, the (H)IBOC-signals are based on OFDM and to prevent FFT-leakage at the receiver the sampling-frequency needs to be fixed to the OFDM-subcarrier spacing defined in REF[1] as:

$$\Delta f = \frac{1488375}{4096} = \frac{135}{2^{14}} * 44.1e3 \approx 363.4 \text{ Hz}.$$

Moreover, to perform an efficient FFT-operation the length of the FFT should be a power of two or a combination of a prime-factor and a power of two. In addition the FFT-length should be larger than or equal to 2*267=534 in the hybrid mode and larger than or equal to 1093 to support the all-digital mode.

Taking these arguments into account the "narrow-band" clock-speed and FFT-size is computed as:

$$N = \frac{F_c}{\Delta f} =$$

$$\frac{m * \frac{135}{2^7} * 44.1e3}{\frac{135}{2^{14}} * 44.1e3} = m * 2^7 \rightarrow \begin{cases} m = 5 \rightarrow N = 5 * 2^7 = 640 > 534 \\ m = 10 \rightarrow N = 5 * 2^8 = 1280 > 1093 \end{cases}$$

and the corresponding sampling-frequency for the hybrid and all-digital mode become;

$$F_c = N * \Delta f = \begin{cases} \text{hybrid} & 5 * \frac{135}{2^7} * 44.1e3 \approx 232 \text{ kHz} \\ \text{all-digital} & 10 * \frac{135}{2^7} * 44.1e3 \approx 465 \text{ kHz} \end{cases}$$

Note, that for the conventional "wide-band" (H)IBOC FM-receiver with an FFT-size of:

$$N = 2043 \approx 2^{11} = 2^4 * 2^7$$

the value of m→16 and, as a consequence:

$$F_c = \frac{135}{2^8} * 44.1e3 \approx 744 \text{ kHz}.$$

Thus, in the hybrid mode, the sample rate conversion is from 650 kHz to ≈232 kHz. Channel-selectivity filtering is performed by the filtering in steps 72, 86, for the lower-sideband and in steps 74, 87 for the upper-sideband, i.e., the channel-filtering in step 94 can be "bypassed". However, it is not excluded in the future. The N-point FFT is based on N=640. Note, that the separation of the "CIC-processing" (see FIG. 7, i.e., filtering, shifting, and CIC) from the OFDM-processing for the hybrid mode makes this different clock-speed use feasible in the narrow-band approach, in contrast to the wideband approach where this separation is not possible.

In the all-digital mode, the sample rate conversion is from 650 kHz to ≈465 kHz. Channel-selectivity filtering is performed by the filtering in steps 72, for the lower-sideband, in step 74 for the upper-sideband, and step 76 for the central-part, i.e., the channel-filtering in step 96 can be "bypassed". However, it is not excluded in the future. The N-point FFT is based on N=1280. Note, that the separation of the CIC-processing (see FIG. 7, i.e., filtering, shifting, and CIC) from the OFDM-processing makes this different clock-speed use feasible in the narrow-band approach, in contrast to the wideband approach where this separation is not possible.

Thus, the OFDM-processing (within steps 94,96) differ between modes.

In the hybrid mode (step 94), the OFDM-subcarrier index is changed compared to the index given in REF [1]. The first OFDM subcarrier of the lower-sideband will have subcarrier index +28 and the last OFDM-subcarrier will have index +218, +237, +256, or +294 depending on the service mode. For the upper-sideband the first OFDM-subcarrier is at index −29 and the last OFDM-subcarrier is on index −219, −238, −257, or −295 depending on the service mode.

In the all-digital mode (step 96), the OFDM-subcarrier indices are the same as described in REF[1], so the lowest OFDM-subcarrier index is −546 and the highest OFDM-subcarrier is +546.

Figure 8:
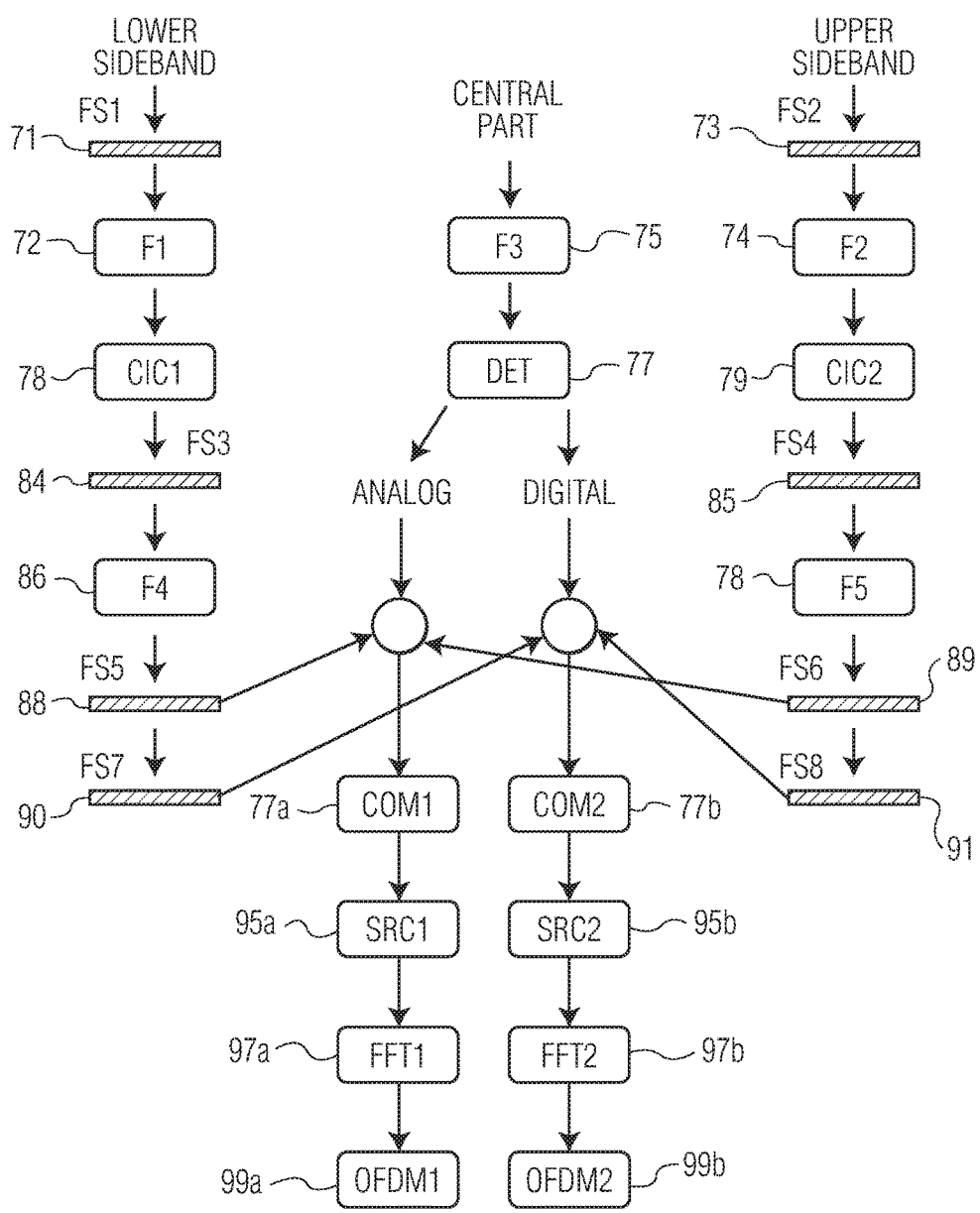
FIG. 8 depicts elements of a signal processor configured to perform the processing method of FIG. 7.

FIG. 8 provides elements of a signal processor configured to perform the steps shown in the flowchart of FIG. 7.

First frequency shifting (FS1) element 71 is configured to shift the lower sideband, while second frequency shifting (FS2) element 73 is configured to shift the upper sideband. A 21 tap finite impulse response (FIR) low pass filter (LPF) 72 (F1) is configured to select the lower sideband, while a 21 tap FIR LPF 74 (F2) is configured to select the upper sideband. Filter 75 (F3) is configured to filter the central part of the received IBOC signal. A first co-channel interference compensation unit 78 (CIC1) is configured to compensate the filtered lower sideband, while a second co-channel interference compensation unit 79 (CIC2) is configured to compensate the filtered upper sideband.

A detection circuit 77 (DET) is configured to detect if the central part is analog or digital. A first combiner 77a (COM1) is configured to combine the filtered upper sideband and the filtered lower sideband to derive a first reconstructed signal if the central part is analog, while a second combiner 77b (COM2) is configured to combine the filtered upper sideband and the filtered lower sideband and the central part to derive a second reconstructed signal if the central part is digital.

A first sample rate converter arrangement (SRC1) 95a is configured to lower the sampling frequency for the first reconstructed signal, while a second sample rate converter arrangement (SRC2) 95b is configured to lower the sampling frequency for the second reconstructed signal. A first FFT processor arrangement 97a (FFT1) is configured to process the selected signal and a first OFDM processor arrangement 99a (OFDM1) is configured to process the first FFT processed signal. A second FFT processor arrangement 97b (FFT2) is configured to process the selected signal and a second OFDM processor arrangement 99b (OFDM2) is configured to process the second FFT processed signal.

A third frequency shifting element 84 (FS3) is configured to shift the frequency shifted lower sideband to be centered on the carrier frequency and a fourth filter 86 (F4) is configured to remove out-of-band residuals of the co-channel interference compensation. A fourth frequency shifting element 85 (FS4) is configured to shift the frequency shifted upper sideband to be centered on the carrier frequency and a fifth filter 87 (F5) is configured to remove out-of-band residuals of the co-channel interference compensation.

A fifth frequency shifting element 88 (FS5) is configured to raise the lower sideband to a specific frequency above the carrier frequency and a sixth frequency shifting element 89 (FS6) is configured to lower the upper sideband to a specific frequency below the carrier frequency, wherein the raised lower sideband and the lowered upper sideband are provided to the first combiner 77a.

Seventh 90 (FS7) and eighth 91 (FS8) frequency shifting elements are configured to restore the frequency shifted upper and lower sidebands respectively back to their original frequency positions, wherein the restored upper and lower sidebands are provided to the second combiner 77b.

Simulations have been carried out of the conventional "wide-band" approach and the "narrow-band" concept of the invention, based on analysis of bit error rates. These show that the "narrow-band" (H)IBOC FM-receiver performs similarly to the conventional "wide-band" (H)IBOC FM-receiver. Moreover, the results of the simulations have also been compared with real-time bench-test measurements with an HD-Radio® compliant receiver.

It has been shown that for an AWGN channel without adjacent channels, the "narrow-band" (H)IBOC performs similarly to conventional "wide-band" (H)IBOC. For the AWGN channel with left or right 1$^{st}$ adjacent channels; the "narrow-band" and "wide-band" (H)IBOC also show similar performance. The "narrow-band" (H)IBOC does introduce FFT-leakage due to not perfectly removed out-of-band CIC residuals originating from 1$^{st}$ adjacent analog FM-channels but, as is shown by the results obtained via simulations, the impact on the performance can be neglected.

The invention enables reduction of clock-speed and OFDM-symbol buffer-size. For example the clock-speed (sampling-frequency) can be reduced to ≈232 kHz, which is ≈30% of the conventional "wide-band" Hybrid IBOC clock-speed of ≈744 kHz, or to ≈465 kHz which is ≈60% of the conventional "wide-band" IBOC clock-speed of ≈744 KHz for the all-digital mode. The OFDM-symbol buffer-size ((I)FFT-length) can be reduced to 640 samples for the hybrid case, which is ≈30% of the conventional "wide-band" IBOC OFDM symbol buffer-size of 2048 samples, or to 1280 samples for the all-digital case, which is ≈60% of the 2048 samples for conventional "wide-band" IBOC. The "host-FM" distortion is similar and the CIC distortion is similar.

The invention relates to the processing of a signal which has been transmitted as an RF signal. For avoidance of doubt, all the processing described above is in the digital domain at baseband, after down-conversion and after analog to digital conversion. The functions to be carried out have been described in terms of filters, combiners, frequency shifting elements etc. However, it will be understood that in practice such elements are implemented as digital signal processing operations to be performed by a controller.

Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A method of processing of an Orthogonal Frequency Division Multiplexing (OFDM) signal, in a Hybrid In-Band On-Channel (HIBOC) processor, comprising a central part centered on a carrier frequency, a lower sideband below a lowest frequency of the central part and an upper sideband above a highest frequency of the central part, the method comprising:
   determining, in the HIBOC processor, if the central part of the OFDM signal is analog or digital based upon statistical analysis of the OFDM signal, wherein the central part is determined to be digital when a ratio between a first moment of the OFDM signal and a second moment of the OFDM signal exceeds a predetermined threshold value;
   frequency shifting, in the HIBOC processor, the lower sideband to be immediately above the carrier frequency and the upper sideband to be immediately below the carrier frequency;
   filtering, in the HIBOC processor, the frequency-shifted lower sideband and the upper sideband and performing co-channel interference compensation;
   combining, in the HIBOC processor, the frequency-shifted lower sideband and the upper sideband to derive a first reconstructed signal when the central part is analog and a second reconstructed signal when the central part is digital;
   performing, in the HIBOC processor, sample rate conversion of either the first reconstructed signal or the second reconstructed signal to produce a selected signal having a lowered sampling frequency which depends on whether the central part is analog or digital;
   Fast Fourier Transform (FFT) processing, in the HIBOC processor, the selected signal; and
   OFDM processing, in the HIBOC processor, the FFT processed signal.

2. The method as claimed in claim 1, further comprising:
   low pass filtering; and
   detecting an $X^2$-distribution of the second moment of the OFDM signal.

3. The method as claimed in claim 1, further comprising:
   channel selectivity filtering the selected signal after the sample rate conversion.

4. The method as claimed in claim 1, wherein the co-channel interference compensation further comprises:
   blending uncompensated versions of the frequency-shifted lower sideband and upper sideband with compensated versions of the frequency shifted lower sideband and upper sideband in dependence on a level of interference.

5. The method as claimed in claim 4, wherein the blending is based on the $X^2$-distribution of the second moment of the OFDM signal.

6. The method as claimed in claim 1, wherein, when the central part is analog, further comprising:
   frequency shifting the frequency shifted lower sideband to be centered on the carrier frequency;
   frequency shifting the frequency shifted upper sideband to be centered on the carrier frequency;
   filtering the centered lower sideband and the centered upper sideband for channel selectivity and removal of an out-of-band residual of the co-channel interference compensation;
   raising the lower sideband to be at a specific frequency above the carrier frequency;
   lowering the upper sideband to be at a specific frequency below the carrier frequency; and
   combining the raised lower sideband and the lowered upper sideband.

7. The method as claimed in claim 1, wherein, when the central part is digital, further comprising:
   restoring the frequency shifted upper and lower sidebands to their original frequency positions;
   filtering the central part of the OFDM signal; and
   combining the restored upper and lower sidebands and the filtered central part to derive the second reconstructed signal.

8. The method as claimed in claim 1, wherein the sample rate conversion of the first reconstructed signal is from 650 kHz to approximately 232 kHz.

9. The method as claimed in claim 1, wherein the FFT processing clock speed for the first reconstructed signal is approximately 232 kHz using a 640 point FFT.

10. The method as claimed in claim 1, wherein the sample rate conversion for the second reconstructed signal is from 650 kHz to approximately 465 kHz.

11. The method as claimed in claim 1, wherein the FFT processing clock speed for the second reconstructed signal is approximately 465 kHz with a 1280 point FFT.

12. A Hybrid In-Band On-Channel (HIBOC) signal processor configured to process a signal comprising a central part centered on a carrier frequency, a lower sideband below a lowest frequency of the central part and an upper sideband above a highest frequency of the central part, the HIBOC signal processor comprising:

a detection circuit configured to detect if the central part is analog or digital based upon statistical analysis of the OFDM signal, wherein the central part is determined to be digital when a ratio between a first moment of the OFDM signal and a second moment of the OFDM signal exceeds a predetermined threshold value;

a first multiplier configured to shift the lower sideband to be immediately above the carrier frequency;

a first filter configured to filter the shifted lower sideband;

a first co-channel interference compensation unit configured to compensate the filtered lower sideband;

a second multiplier configured to shift the upper sideband to be immediately below the carrier frequency;

a second filter configured to filter the shifted upper sideband;

a second co-channel interference compensation unit configured to compensate the filtered upper sideband;

a third filter configured to filter the central part;

a first combiner configured to combine the filtered upper sideband and the filtered lower sideband to derive a first reconstructed signal if the central part is analog;

a second combiner configured to combine the filtered upper sideband and the filtered lower sideband and the central part to derive a second reconstructed signal if the central part is digital;

for the first reconstructed signal, a first sample rate converter configured to lower a sampling frequency, a first FFT processor configured to process either the lowered first reconstructed signal or the second reconstructed signal; and a first OFDM processor configured to process the first FFT processed signal; and for the second reconstructed signal, a second sample rate converter configured to lower the sampling frequency, a second FFT processor configured to process the selected signal and a second OFDM processor configured to process the second FFT processed signal.

13. The processor as claimed in claim 12, further comprising:

a third multiplier configured to shift the frequency shifted lower sideband to be centered on the carrier frequency;

a fourth filter configured to remove out-of-band residuals of the co-channel interference compensation;

a fourth multiplier configured to shift the frequency shifted upper sideband to be centered on the carrier frequency;

a fifth filter configured to remove out-of-band residuals of the co-channel interference compensation;

a fifth multiplier configured to raise the lower sideband to a specific frequency above the carrier frequency; and a sixth multiplier configured to lower the upper sideband to a specific frequency below the carrier frequency, wherein the raised lower sideband and the lowered upper sideband are provided to the first combiner.

14. The processor as claimed in claim 12, wherein the first sample rate converter is configured to convert from 650 kHz to approximately 232 kHz and the second sample rate converter is configured to convert from 650 kHz to approximately 465 kHz; the first FFT processor has a clock speed approximately 232 kHz using a 640 point FFT, and the second FFT processor has a clock speed approximately 465 kHz using a 1280 point FFT.

15. The processor as claimed in claim 12, further comprising:

seventh and eighth multipliers configured to restore the frequency shifted upper and lower sidebands respectively back to their original frequency positions, wherein the restored upper and lower sidebands are provided to the second combiner.

* * * * *